(No Model.)  9 Sheets—Sheet 3.
J. NORTH.
TYPE SETTING MACHINE.
No. 261,378. Patented July 18, 1882.
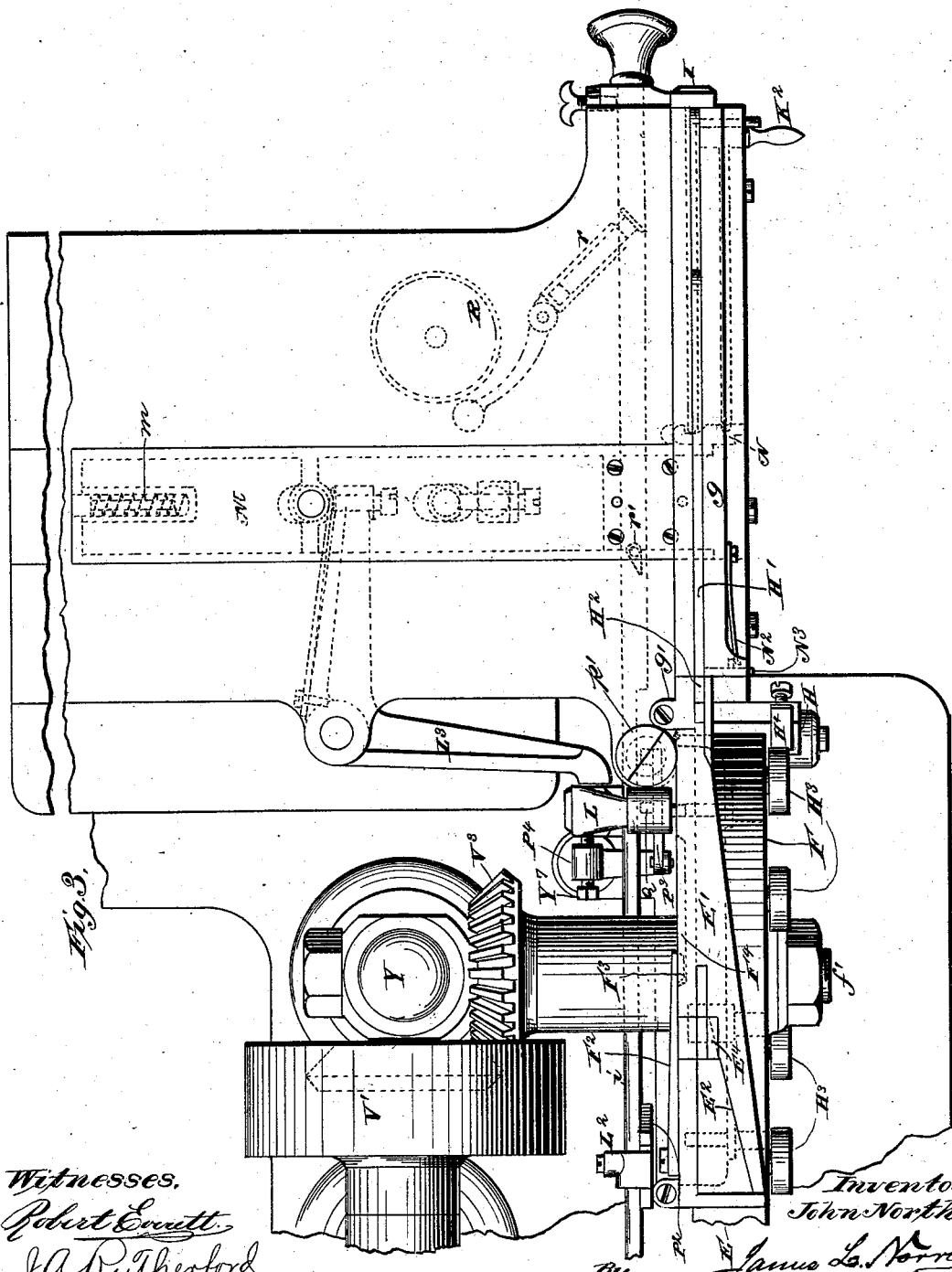
Witnesses.
Robert Everitt
J. A. Rutherford
Inventor
John North.
By James L. Norris.
Atty.

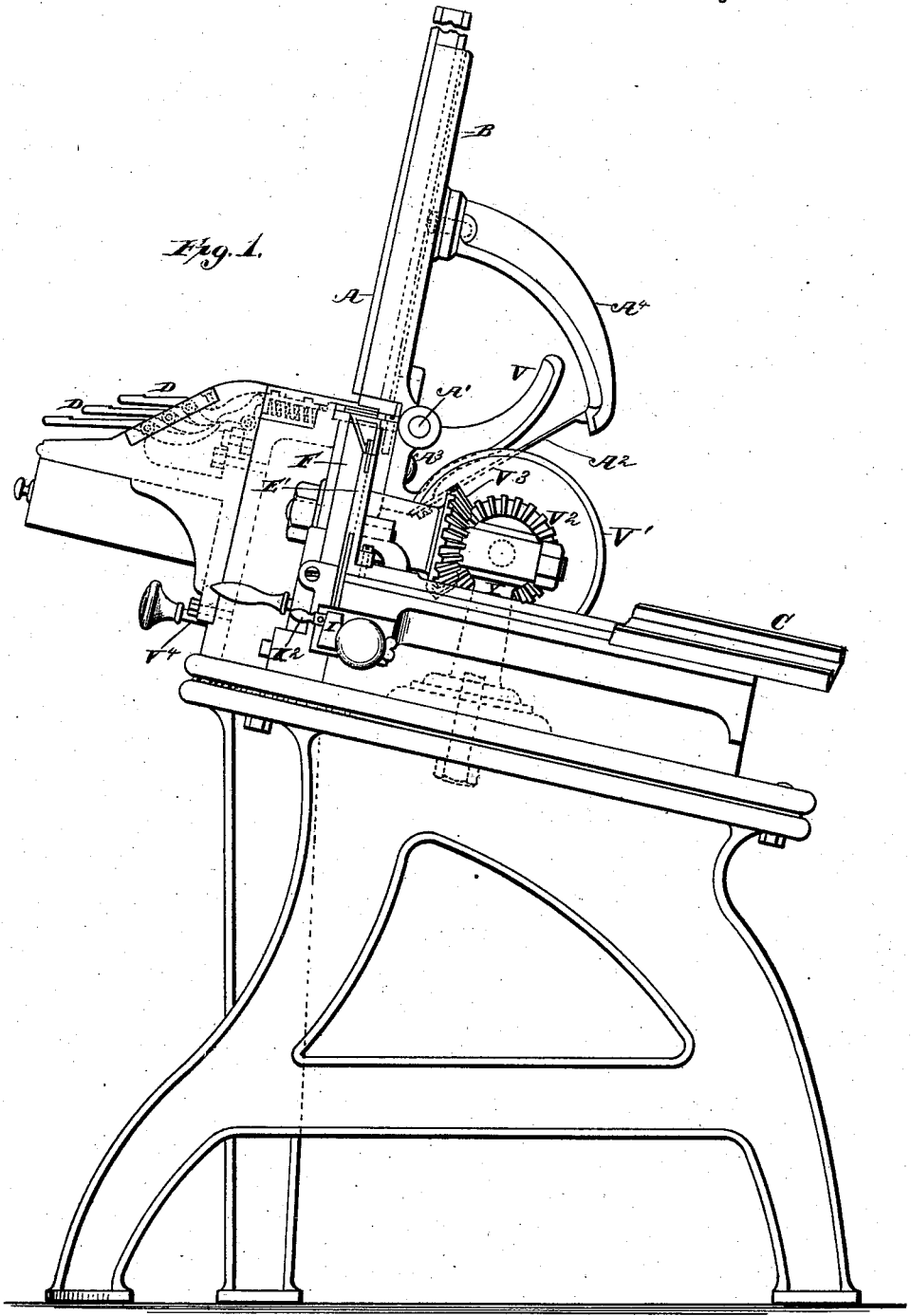

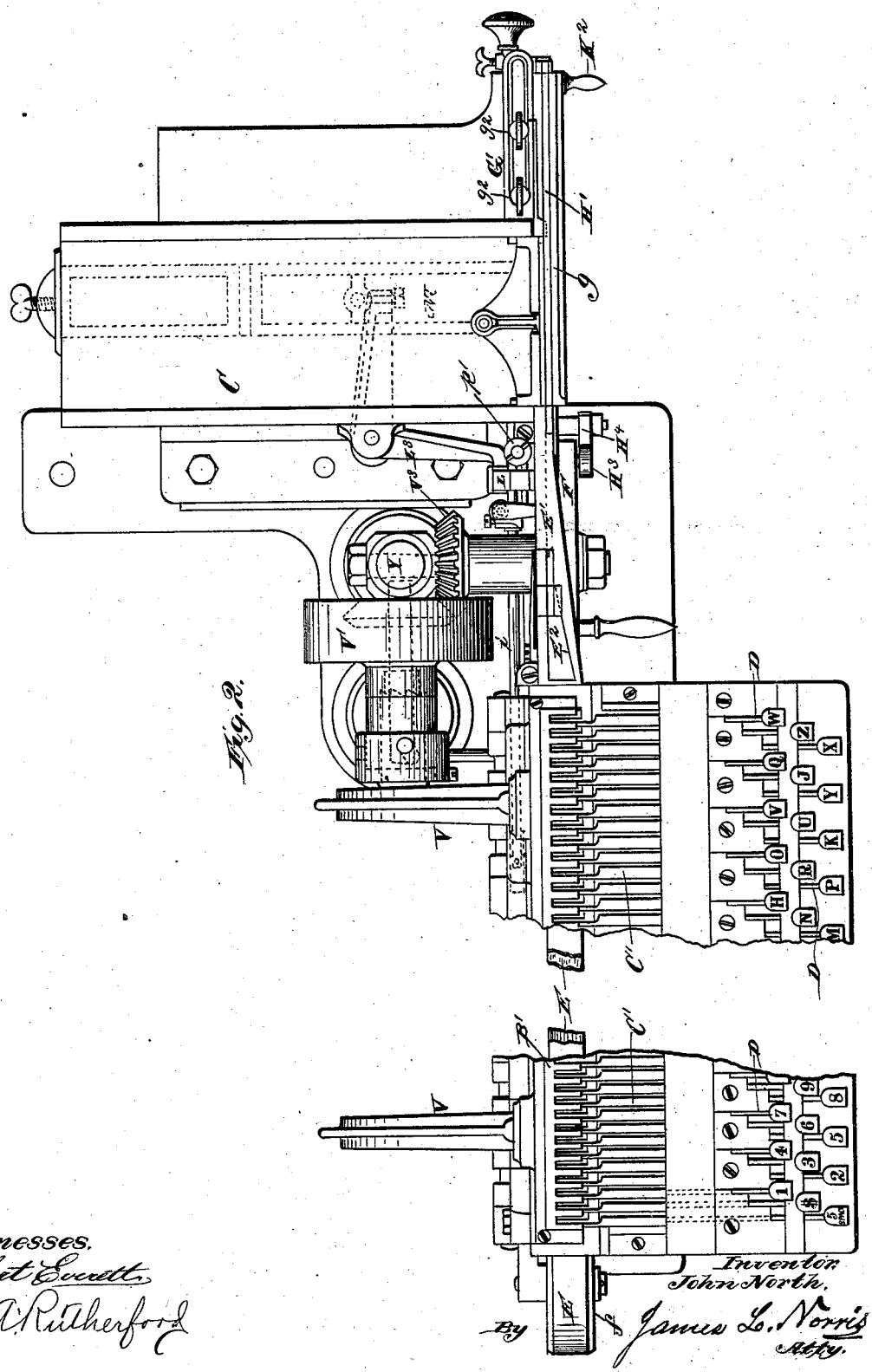

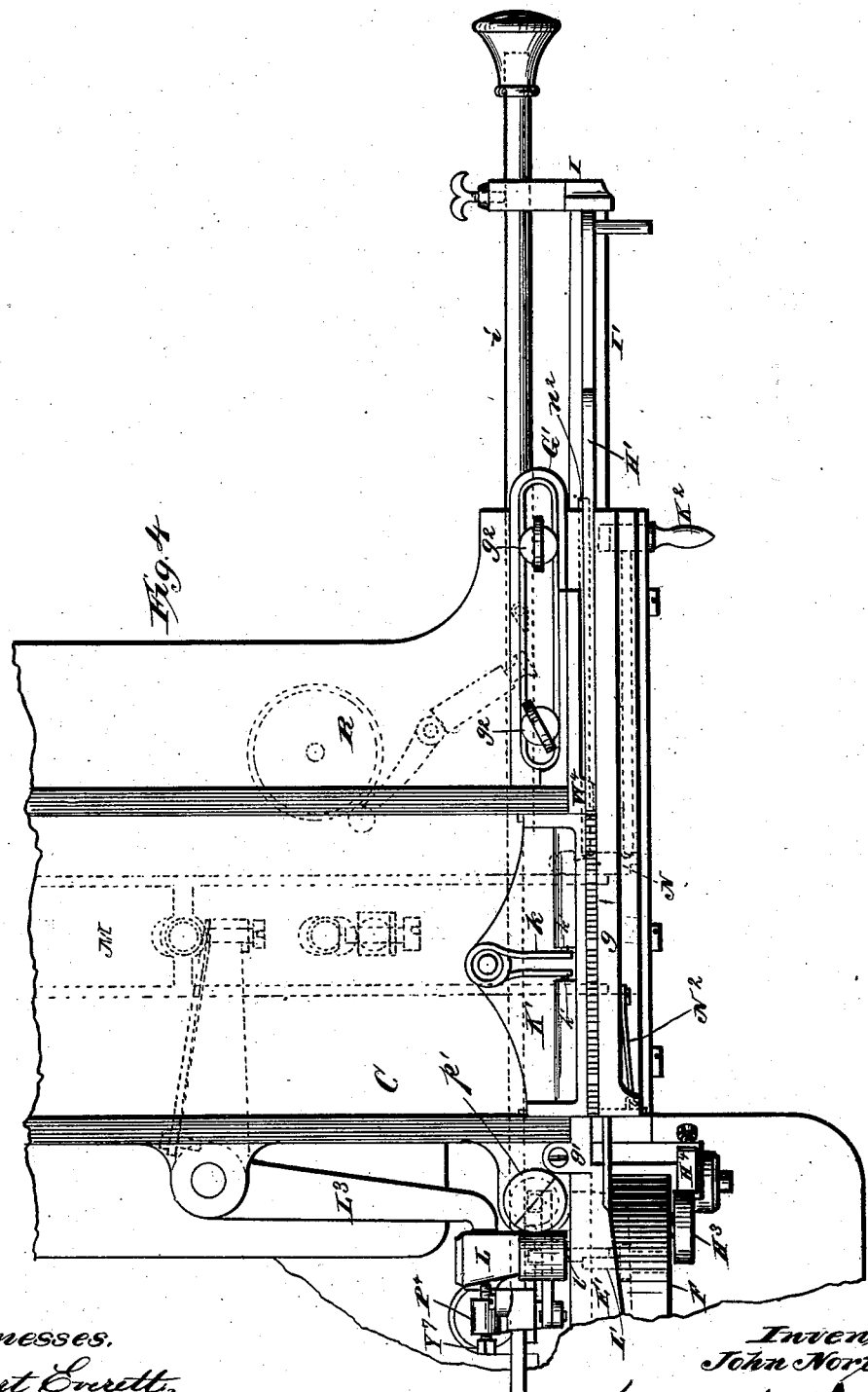

(No Model.)
9 Sheets—Sheet 5.
J. NORTH.
TYPE SETTING MACHINE.
No. 261,378.  Patented July 18, 1882.
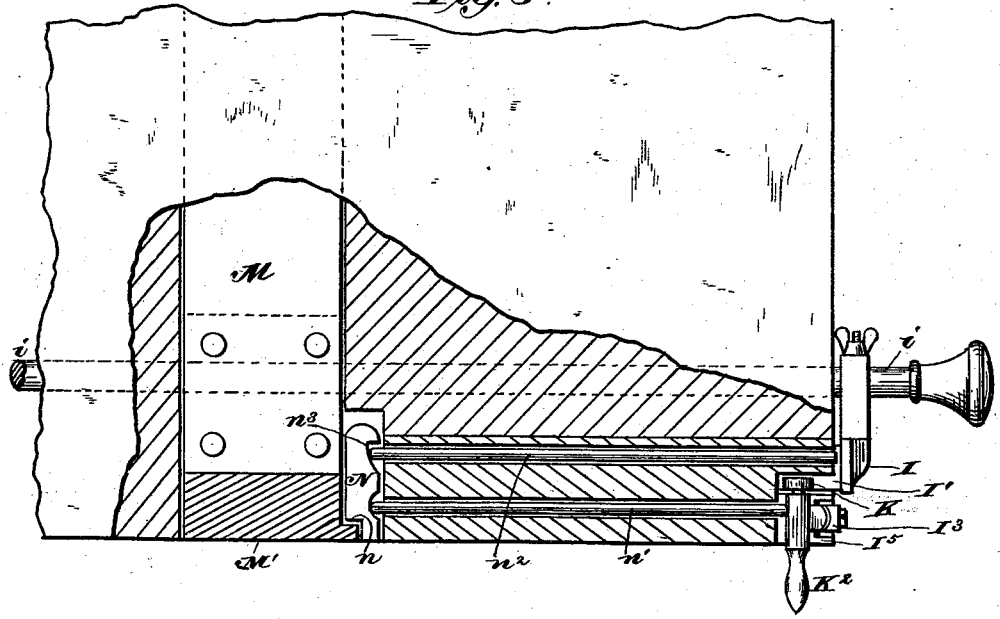
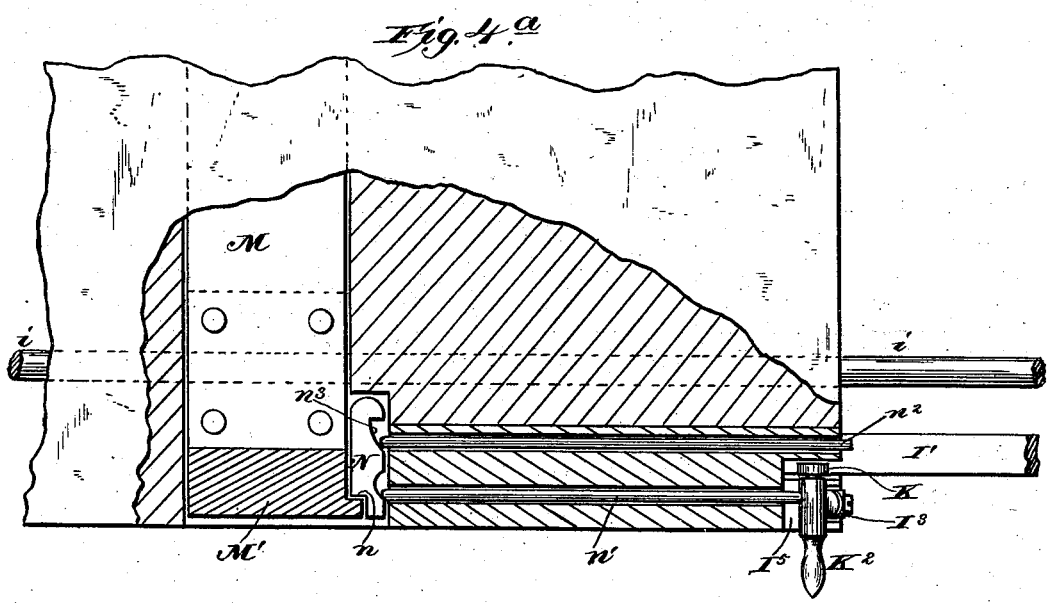
Witnesses.
Robert Everett
J. A. Rutherford
Inventor
John North.
By James L. Norris.
Atty.

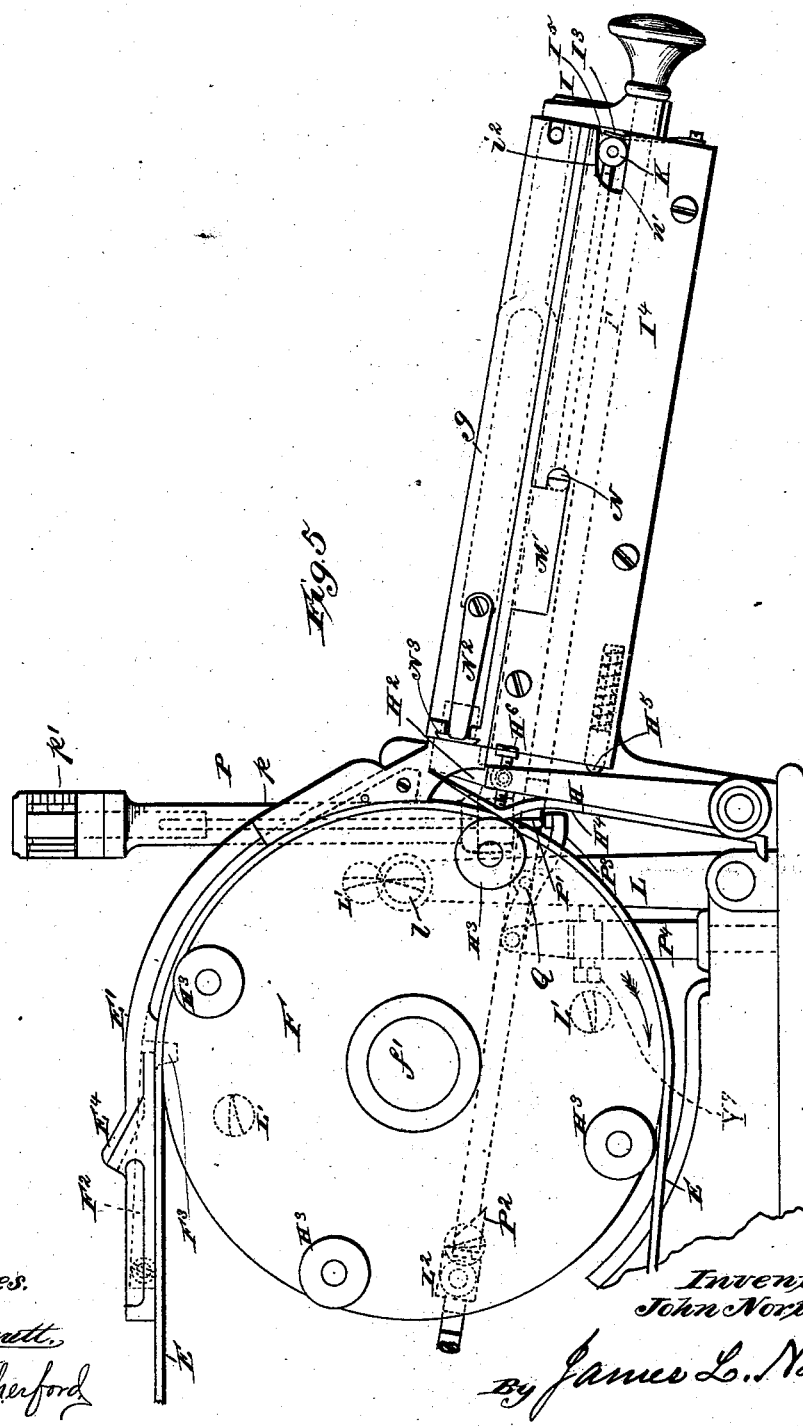

(No Model.) 9 Sheets—Sheet 7.
J. NORTH.
TYPE SETTING MACHINE.
No. 261,378. Patented July 18, 1882.
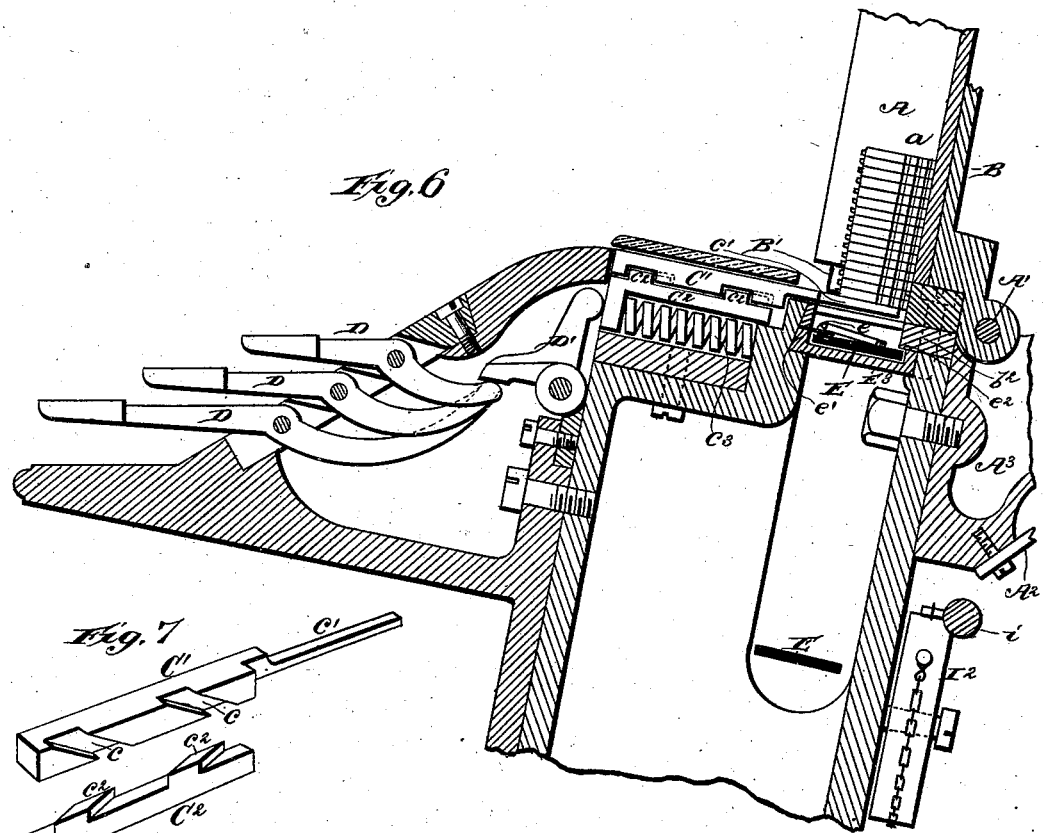
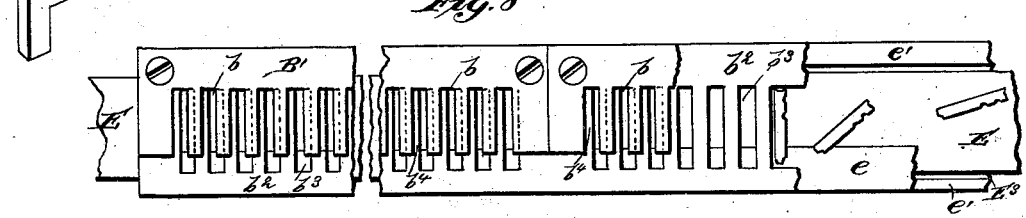
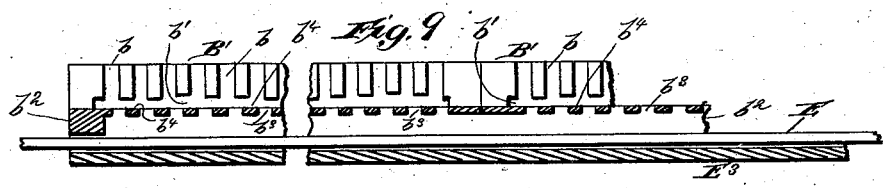
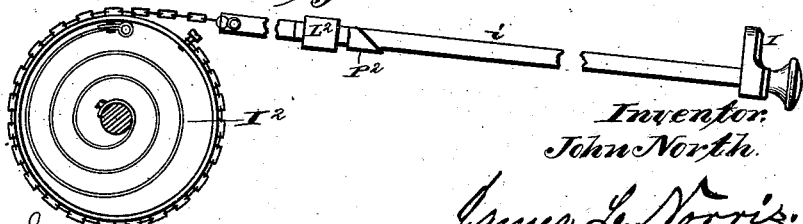
Witnesses.
Robert Everett
J. A. Rutherford
Inventor:
John North.
By James L. Norris.
Atty

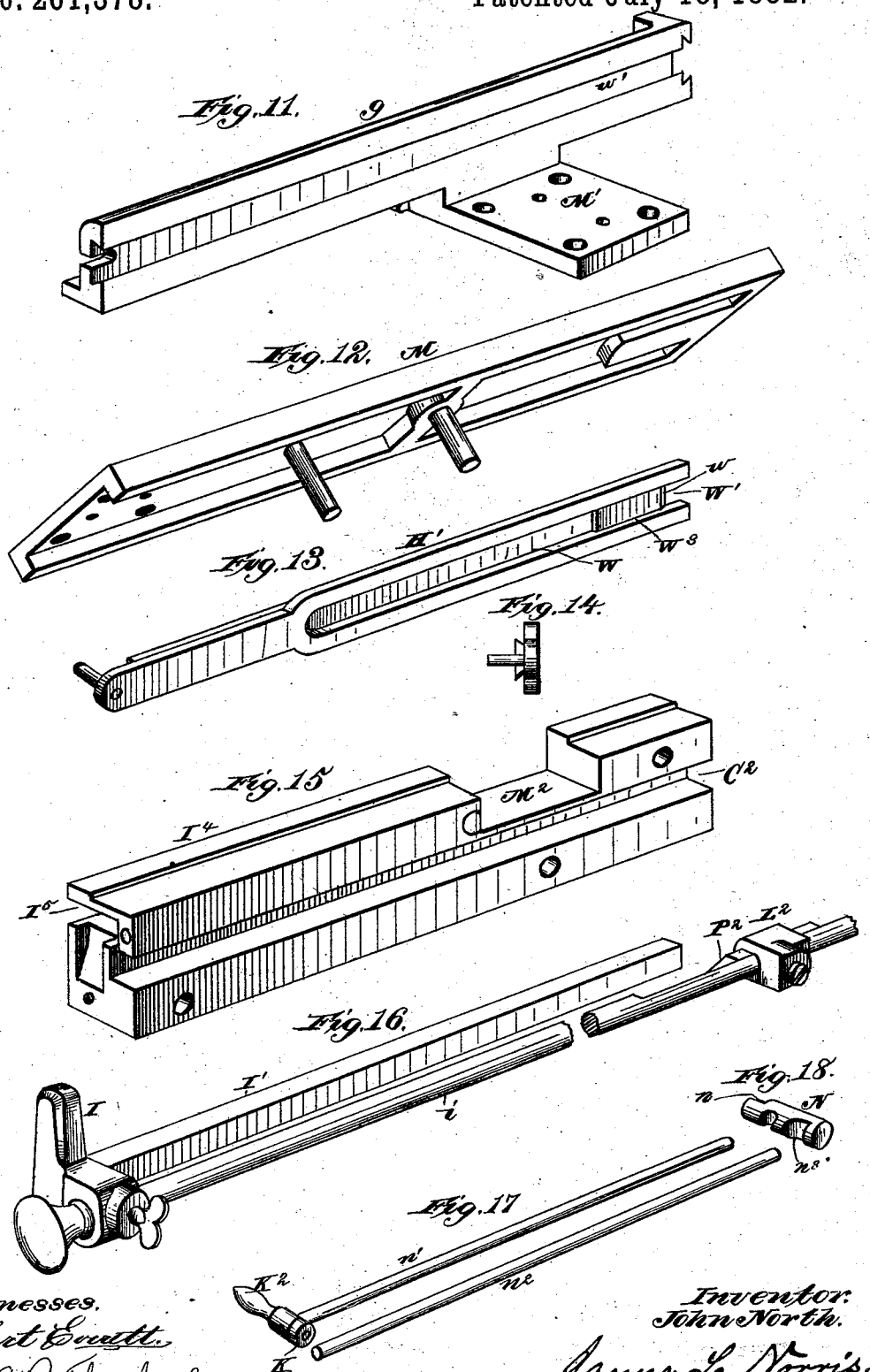

(No Model.)
9 Sheets—Sheet 9.
J. NORTH.
TYPE SETTING MACHINE.
No. 261,378. Patented July 18, 1882.
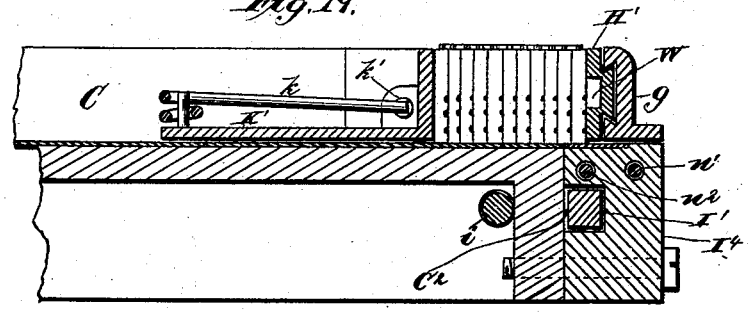
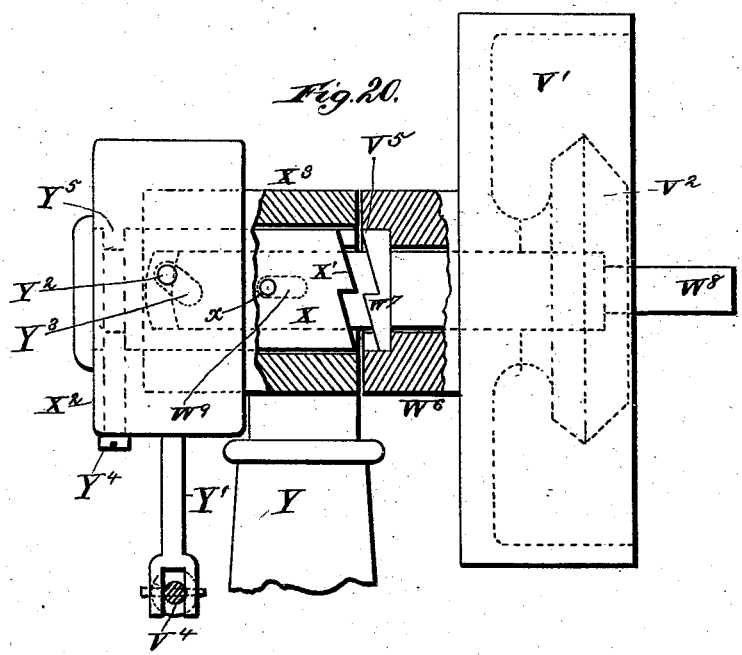
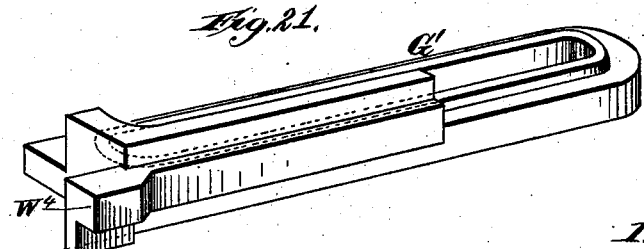
Witnesses.
Robert Ewart.
J. A. Rutherford
Inventor.
John North.
By James L. Norris.
Atty

UNITED STATES PATENT OFFICE.

JOHN NORTH, OF MIDDLETOWN, CONNECTICUT.

TYPE-SETTING MACHINE.

SPECIFICATION forming part of Letters Patent No. 261,378, dated July 18, 1882.

Application filed June 29, 1881. (No model.)

*To all whom it may concern:*

Be it known that I, JOHN NORTH, a citizen of the United States, residing at Middletown, in the county of Middlesex and State of Connecticut, have invented new and useful Improvements in Type-Setting Machines, of which the following is a specification.

This invention relates to an improvement on the type-setting machine secured to me by Letters Patent No. 221,853, November 18, 1879.

The principal objects of my present invention are to provide improved means for supporting and guiding the type carrying belt, also to provide a device for turning the type on the belt which will not become clogged with the type.

A further object of my invention is to simplify the devices for delivering the type into line before the galley, and also to improve the devices for controlling the type-support and the line-breaker.

A further object is to adapt the machine to receive galleys of different sizes, and also to provide a type-packer and an indicator, all as hereinafter fully described.

In the annexed drawings, Figure 1 is an end view of my improved machine; Fig. 2, a top or plan view with a portion of the machine broken away. Fig. 3 is a plan view, on an enlarged scale, of a portion of the machine, principally illustrating the galley, yielding type-support, line-breaker, and spout or chute; Fig. 3ª, a horizontal plan view, partly in section, taken on a line immediately under the line-breaker, the parts being in their normal position. Fig. 4 is a top or plan view, showing most of the elements represented in Fig. 3, and illustrating a line of type in front of the galley; Fig. 4ª, a view similar to Fig. 3ª, showing the position of the parts when the line-breaker is moved inward toward the galley. Fig. 5 is a side elevation of Fig. 3. Fig. 6 is a transverse vertical section of a portion of the machine, and principally illustrates the keys, the type pusher and follower, a portion of one of the type-cases, and the devices for guiding and holding down the endless type-carrier belt. Fig. 7 shows in perspective the type pusher and follower. Fig. 8 is a top or plan view of the slotted type-support, the slotted plate constituting the type-rests, the guide for the endless type-carrier band, and a section of the said band. Fig. 9 is a longitudinal section taken through Fig. 8. Fig. 10 shows the rod that is connected at one end with a spring, and at its opposite end connected with a head which is arranged to be extended out from the machine by the action of the yielding type-support thereon, as hereinafter described. Fig. 11 is a perspective view of the line-breaker. Fig. 12 is a perspective view of a slide which works under the galley and connects with the line-breaker shown in Fig. 11. Fig. 13 is a perspective view of the yielding type-support. Fig. 14 is an end view of Fig. 13. Fig. 15 illustrates a grooved block that is secured to the main frame in front of the galley. Fig. 16 is a perspective view of the head and rod shown in Fig. 10, and also illustrates a slide-bar connected with said head. Fig. 17 shows in perspective a device for preventing the retraction of the said head and rod until after the line has been broken and moved by the line-breaker into the galley. Fig. 18 shows a pin which constitutes a portion of the device illustrated in Fig. 17. Fig. 19 is a section taken through the line-breaker, the yielding type-support, and a portion of the galley, and illustrates several lines of type set up in the galley. Fig. 20 illustrates the clutch mechanism for applying power to the machine. Fig. 21 is a perspective view of the adjustable slotted bar that is employed for securing the galley in position to receive the lines of type.

In this machine I propose providing any desired number of type cases or trays, A, the case-holders B for the same being mounted upon a common shaft, A', and supported in the raised position shown in Figs. 1 and 6 by means of the spring-bars A², that are secured at their lower ends to the base of the bracket A³, bolted onto the main frame, said springs being connected at their upper ends with arms A⁴, projecting from the backs of the case-holders. The shaft upon which the case-holders are hinged is secured in the bracket just referred to, and best illustrated in Fig. 6. These type cases or trays are provided with parallel type-channels $a$, in which the types are distributed according to letter, and from whence they are successively removed to the galley C, and there arranged in lines of words in the manner to be described.

The type case or support B' (see Figs. 6, 8, and 9) is formed with a series of slots or passages, $b$, which constitute continuations of the type-channels $a$ when the cases are arranged upon the said type-case rest. Below the lower ends of the throats or passages of the case-rest is a plate, $b^2$, formed with a series of slots, $b^3$, (see Figs. 8 and 9,) of sufficient width and length for the type to drop through, the portions of said plate between these slots constituting a series of type-rests, $b^4$, adapted to sustain the rows of type in the channels of the cases and the throats or passages of the case-rest, space $b'$ being left between the said type-rests and the lower ends of the walls of channels $b$ in the case-support, so that a type resting upon one of the said type-rests $b^4$ can be moved laterally from the same into a position which will admit of its dropping down through recess $b^3$ onto the belt and type-turning plate. These type-rests of the plate $b^2$ are arranged under about one-half of the width of the passages of the case-rest, so as to sustain the columns of type, as aforesaid.

The devices for taking the type from the channels in the case-rest are as follows:

C' indicates a series of type-pushers, each of which consists of a bar formed with oblique recesses $c\ c$ upon its under side, and further provided with a finger, $c'$, that is designed to act upon the type. The plungers $C^2$ for actuating the type-pushers each consist of a short bar provided with lugs $c^2$, having oblique edges, and adapted to fit into the recesses of the type-pushers. The springs $C^3$, Fig. 6, force these plungers back or outward, and hence normally free the pushers from the type. To throw the plungers inward for the purpose of delivering the type onto the endless carrier-belt, I provide banks of pivoted keys D, provided with the required letters, numbers, and signs, and arrange the same to act upon pivoted two-armed levers D', which in turn act upon the plungers, so that with each depression of a key a plunger will be thrown inward, and the lugs upon said plunger, acting in the walls of the oblique grooves in the type-pusher, will drive the latter to the right across the type-rests $b^4$, whereby the pointed end or finger on the pusher will force laterally from said rest a single type which may be resting upon it. The type then immediately drops through one of the slots $b^3$, the foot of the type falling upon the endless carrier-belt E, and the head of the type falling upon a horizontal plate, $e$, which is arranged in close proximity to the surface of the said belt.

The plate $e$ consists of a lip or flange formed with or secured upon the inner one of two marginal ribs, $e'\ e'$, of a long plate, $E^3$. The belt runs over the plate $E^3$, and is guided between said ribs and under the plate or lip $e$, which latter not only serves to hold the belt down and prevent any ruffling of the same, but also serves to turn the type, as presently explained. This long plate $E^3$, with its marginal ribs, supports the belt and forms a guideway for it to pass through. The plate $b^2$, already referred to, is thickened or extended down at one edge, as at $e^2$, so as to hold down the back edge of the belt. By these means both edges of the belt will be prevented from rising, one edge being held down by the plate $b^2$ and the other edge by the plate or lip $e$. The foot of the type will be carried onward by the belt and its head retarded by the plate or flange $e$ until by the movement of the belt the type will be swung to a nearly longitudinal position on the latter and clear of the said plate. In this position the type will be carried by the belt foot foremost in a longitudinal or approximately longitudinal position with relation to the belt until it enters a curved chute, E', in the entrance of which is an inclined piece, $E^2$, (see dotted lines, Fig. 3,) arranged so that if the type rests obliquely on the belt its head will strike against the incline, which will throw the type toward the center of the belt, and thus right the same.

The endless carrier-belt passes around the pulley-wheel $f$ at one end of the machine, which said wheel will be mounted in bearings made adjustable in any ordinary way for taking up the slack, and it also passes around the large driving belt-wheel F at the opposite end of the machine, this latter wheel being mounted upon a shaft, $f'$, arranged to bring the wheel under the curved chute, so that the endless carrier-belt in passing around this wheel passes just below the curved chute, and hence carries the type through the same. The type are carried through the chute by the endless belt, and then, passing around a portion of the wheel, drop down feet foremost into the space between the galley and the line-breaker $g$, Figs. 2, 3, and 4. The galley is laid upon a table or stand comprised in the main frame of the machine, and it is secured in place between a stop, $g'$, (see Fig. 3,) and an adjustable clamp, G', (see Figs. 4 and 21,) which is slotted and held in adjustment by means of set-screws $g^2$ $g^2$ passing through the slot into the main frame. This adjustable clamp brings the edge of the galley into line with the delivery spout or chute and parallel with the column of type. It also admits of the ready removal of the galley and its replacement by an empty one, and, moreover, it admits of galleys of various sizes being used. The type, in falling down from the chute into line in the passage-way formed between the galley and the type-line breaker, drop between the packer H and the type-support H'. The location of this space between the line-breaker and the galley and between the type-support H' and the packer H will readily be comprehended by referring to Fig. 4, in which the type-support is extended out from all of the spaces in part of the galley, and the said space is shown filled with type. This type-support, which is best shown in Figs. 13 and 14, consists of a flat bar of metal of the thickness of the type, or thereabout.

It is formed with a longitudinal groove or recess, W, which is formed at one end with a somewhat shallower portion, $W^3$. The end of the said type-support against which the end of the line of the type abuts is cut away, as at W′, and the plate beveled at the end of the recess, as at $w$. This construction of the type-support with the groove W and cut-away portion W′, Fig. 13, allows it to slide partly over or on the clamp G′, and also to slide past a stop, $W^4$, (see Fig. 21,) that is arranged to project laterally from one end of the adjustable clamp G′, the said stop being received into the recess of the type-support. This yielding or sliding type-support is provided with a dovetailed tongue, (shown in Fig. 14,) which fits in a dovetailed groove, $w'$, in the line-breaker, (see Fig. 11,) whereby the type-support will be guided in its movement. The object of the beveled part $w$ of this type-support will be explained farther on. The type-support yields before the row of types as they are forced forward by the packer, and has an automatic retractile action at the completion and removal of a line of given length, as will be hereinafter particularly explained.

The packer H, (see Fig. 5,) which forces the type in line against the yielding type-support, consists of an upright vibratory lever pivoted at its lower end, and provided at its upper extremity with a striking-head, $H^2$, which is adapted to extend somewhat above the center of the type. This lever is vibrated forward in order to give each successive type falling from the chute the required degree of impact by means of a series of small wheels or rollers, $H^3$, arranged at intervals upon one side of the wheel F, near its periphery. This wheel revolves at any desired rate of speed, and the wheels or rollers $H^3$ thereon are so timed that each type delivered by the spout or chute will be acted upon by the packer by reason of a forward movement given to the latter by the small wheels upon the said belt-wheel F. To prevent too sudden shock when the wheels actuate the packer, I arrange alongside of the same a spring, $H^4$, that is bent away from the packer-lever near its upper end, so as to form an elastic cushion, against which the wheels or rollers $H^3$ will strike in rapid succession. $H^6$ indicates a set-screw, that passes through the upper end of the packer and bears against the spring $H^4$, whereby the latter can be adjusted with relation to the packer as circumstances may require. This packer, when thrown forward, acts against a spring-plunger, $H^5$, which serves to throw the packer back again during the intervals between the action of the wheels or rollers thereon. As the space between the galley and the line-breaker is filled with type, the end of the column abuts against the type-support, which forces out from the main frame an extensible head, I. This head is supported by a sliding bar, I′, arranged to slide in a suitable channel formed in the block $I^4$, that is bolted onto the main frame.

In order to give the yielding type-holder the automatically-retractile action before alluded to, I adjustably connect with the head I a long rod, $i$, that is extended back to a spring, $I^2$, with which it is connected. The adjustable connection between the head and the rod $i$ enables me to vary the length of row between the head and spring, and thus adapt the same to galleys of various sizes. This adjustment is effected by means of a knob or set-screw arranged upon the end of the rod which extends through the head. The form of spring preferred is that of a watch or barrel spring, although other forms of retractile springs might be employed. As the type-holder yields to the column of type and the spring-head is forced out by the said yielding type-holder, it becomes necessary to provide means for preventing the retraction of the head and the type-holder until after a line of type shall have been moved into the galley by the line-breaker. To such end I form in the block $I^4$ a recess having an inclined wall, $i^2$, in such position that a wedge-shaped recess, $I^5$, (plainly shown in Fig. 5,) will be formed between said inclined wall and one side of the bar I′, which carries the head I. Within such wedge-shaped space or recess I place loosely a jam-roller, K, provided with a stem or pin, $K^2$, (see Fig. 17,) the object of which will be explained farther on. Now, as the extensible head is projected forward by means of the yielding type-support, the loose jam-roller will be forced into the smaller portion of the wedge-shaped recess by means of a spring, $I^3$, (see Fig. 5,) whereby any tendency of the head and said bar to draw back by reason of the retractile force of the spring will be instantly checked by the loose roller wedging into the smaller portion of the wedge-shaped recess, so that it will jam against the bar I′. The spring $I^3$ is attached to the block $I^4$, (see Fig. 5,) said spring being arranged to bear against the pin $K^2$ of the jam-roller, so as to prevent the same from coming out of the end of the frame, and also tending to throw the said pin back, in order to maintain the jam-roller in the smaller portion of the wedge-shaped recess for the purpose just mentioned. When the line of type has been completed and the yielding type-support is forced outward, so as to clear the open end of the galley, the line-breaker will be forced toward the galley C, breaking a measured line of type from the row being formed and forcing said line laterally into the galley against an abutment, K′, which is held therein by means of the spring $k$ pressing against rods $k'$, which act against the walls of the galley, said spring permitting the abutment K′ to yield sufficiently to allow the line of type to enter. The pressure of the line-breaker against the type-support H′ at the completion of the line in front of the galley will cause the beveled portion $w$ at the inner end of the type-support to bear against the stop $w^4$, by reason of which the type-support will be moved farther forward, and hence drawn away from the line of type, the end of which line will at this point be now supported by the said stop $w^4$ until the line-breaker moves the line into the galley.

The mechanism for operating the line-breaker $g$ is arranged as follows:

L indicates an upright vibratory lever that is pivoted at its lower end in a casting at the base of the main frame, the upper end of said lever being provided with a stud, $l$. (Shown in dotted lines, Fig. 5, and also shown in Fig. 4.) The wheel F is provided with a series of studs, L′, (shown in dotted lines in Fig. 5,) on the side opposite to that on which the rollers that actuate the packer are arranged. During the formation of a line of type this lever will stand normally somewhat to the left of a vertical plane and out of the path of the studs, so that the said studs L′, carried by the wheel, will pass outside of the stud upon the upper end of the lever without coming into contact therewith. When, however, the line in front of the galley is completed, a hub or sleeve, $L^2$, (shown in dotted lines in Fig. 5 and in full lines, Fig. 16,) upon the rod $i$ abuts against the said lever and throws it forward, so that its stud will lie in the path of the studs L′, carried by the wheel. The action of a stud, L′, upon the wheel against this head or stud of the lever will force the latter still farther forward, causing it to act upon and vibrate a bell-crank lever, $L^3$, which is pivoted to the main frame. This bell-crank lever is arranged to actuate a slide, M, (best shown in Fig. 12,) which is arranged in suitable guides below the galley C, and which is connected by a plate, M′, (see Fig. 11,) with the line-breaker $g$, so that as the bell-crank lever carries the slide forward the line-breaker will be moved in a like direction, and, breaking a line of type, carry the same forward into the galley against the yielding abutment. The plate M′ works in a recess, $M^2$, formed in the block I, that is bolted onto the main frame. The slide M, in the above movement, is forced against the pressure of a spring, $m$, (shown in dotted lines, Fig. 3,) so that as soon as the lever L has been relieved from the action of the stud upon the wheel the spring will push back and restore the slide, bell-crank lever, and line-breaker to their normal positions. In order to now retract the type-support by releasing the head I, which during this operation has been extended, as before described, by reason of the action of the jam-roller K, wedged in between the inclined wall of the wedge-shaped recess and the bar I′, that is secured to the head, I provide the following device:

Within a recess in the block $I^4$, I arrange loosely a pin, N, (shown in dotted lines in Figs. 3 and 4 and in full lines, Figs. 3ª, 4ª, and 18,) said pin being free to move laterally with relation to the movement of the line-breaker. This pin is formed with a shoulder, $n$, and is arranged so that the line-breaker, in its forward movement in breaking the line, will abut against the said shoulder, and hence carry the pin with it. This movement of the pin brings it opposite the ends of the two rods $n'$ $n^2$, the former of which is secured at its outer end to the pin or handle $K^2$, which carries the jam-roller K, the rod $n^2$ being unconnected with the said handle and lying in a suitable passage in block $I^4$. The rod $n'$, which also passes through a like passage in said block, will be forced outward by the action of the pin N against its inner end when the pin is thus carried forward by the line-breaker, and hence the pin or handle $K^2$, carrying the jam-roller, will be forced against the pressure of spring $I^3$, thereby moving the jam-roller from the smaller inner part of the wedge-shaped recess into the larger outer portion thereof. Now, when the line-breaker is retracted after breaking it will not, as a matter of course, retract the pin N, since it is not connected with it. The rod $n'$, then being backed or held at one end by pin N, will consequently hold the jam-roller stationary in the larger end of the wedge-shaped recess, and hence leave the head I, with its bar I′, free to draw back by the spring connected with rod $i$. As the head is thus brought back it will push back the type-support, so that the latter will be brought in front of the line in the galley, in position to support the end of the line being formed. To cause the retraction of the pin N so as to bring it into its first position, I form it with an incline, $n^3$, against which the loose rod $n^2$ will be pressed at the proper moment by the head I, which is being drawn back, as aforesaid, whereby the pin will be pushed back, and thus free the jam-roll and rod connected therewith from the stop or check which said pin has constituted. The line-breaker is provided with a flat spring, $N^2$, the free end of which is next to one end of the line-breaker, in position to act on a small dovetailed step or plunger, $N^3$, which will hold back a type in case of a type projecting partially beyond the wall of the galley, or in case a type of larger size should find its way into the line when the line is ready to be broken. This spring and plunger, while holding the type from entering the galley, admits of the free movement of the line-breaker for breaking.

P, Fig. 5, represents an indicator, consisting of a hollow column, $p$, with a graduated scale, $p'$, at the top. Within this column is a movable rod, P′, made somewhat larger at its upper end, so as to afford sufficient weight for bringing the rod down with the requisite degree of rapidity.

A wedge or key, $P^2$, (see especially Fig. 16,) is inserted between the hub or sleeve $L^2$ and the rod $i$, so that it can be adjusted independently of the adjustment of the said hub and its end be extended to a greater or less extent in advance of the same. After the hub and wedge have once been adjusted, however, they will require no further adjustment for the different width of galleys which I can use, since any requisite adjustment for such various width of galley can be effected by means of the knob or thumb-screw on the end of the rod $i$, which extends through the head I, and which is controlled by the spring, as before described. A lever, $P^3$, is pivoted upon a fixed standard, $P^4$, and is provided with a stud, Q, against which the inclined end of the wedge or key $P^2$ strikes at the proper moment as the rod $i$ advances, whereby the said lever will be raised and strike against the lower end of the rod, which passes up through the hollow column of the indicator. The wedge acts upon the said lever in advance of the action of the hub against the vibratory lever L, which causes the movement of the line-breaker, so that the indicator-rod will be raised to indicate the condition of the type, and hence approximately the number of letters in the line, before the line is completed, thereby enabling the operator to tell at a glance the condition of the line and to judge of the letter or space or dash to be placed at its end. In order to obviate the necessity of watching the indicator during the entire progress of the work, I provide upon the frame adjacent to the galley a bell, R, (shown in dotted lines, Figs. 3 and 4,) the striking-lever $r$ of which will be sounded by means of a dog, $r'$, upon the rod $i$ coming in contact therewith as the rod is drawn forward by the head. This dog is so timed with relation to the indicator-operating mechanism that the bell will be caused to sound at the time the indicator-rod commences to rise, thus giving warning to the operator that the indicator mechanism is about to work, and thereby showing at once whether the operator can get into the line the entire word or syllable to be set up at the end of the same.

The standard $P^4$ supports a set-screw, $Y^7$, which can be adjusted so as to check the lever L at the proper point when it drops back, so as to allow the studs on the wheel to pass outside of its upper end.

It will be seen that by reason of the springs $A^2$ supporting the tray-rests the latter can be drawn back so as to admit of the ready withdrawal of the trays or type-cases.

To a bracket secured to the main frame I affix upwardly-extending curved arms V, one for each tray-case, so that when the trays are drawn back to the required extent they will rest upon and be supported by the said arms. Motive power is applied to a loose belt-pulley, $V'$, upon the shaft of which is a miter-gear, $V^2$, engaging a similar gear, $V^3$, mounted upon the shaft of the main driving band-wheel F. These miter gear-wheels will in practice be protected by suitable casings, so as to exclude dust therefrom and improve the appearance of this portion of the machine. This driving mechanism is supported by the two standards Y, but one of which is shown in Figs. 1 and 2, one of said standards being employed for supporting the delivery-wheel and the other the band-wheel.

In order to time the delivery of the type with reference to the action of the rollers upon the vibratory packer, I attach to the main spout or chute a spring-plate, $F^2$, adapted to enter the chute through a slot in one of the sides of the latter, so as to check the passage of the type. The spring-plate is provided with an arm or stud, $F^3$, that rides along the wheel F, near the periphery of the latter, the said wheel having a series of recesses, $F^4$, with inclined walls at their ends, one of which is illustrated in dotted lines, Fig. 3. When the stud on the spring-plate enters one of these recesses the spring-plate will enter the chute and check the passage of the type. When, however, an inclined end wall of the recess strikes the said stud the spring-plate will be thrown out, and so remain until its stud again drops into another recess. These recesses correspond in number with the number of rollers that act on the packer, and are so timed that while the packer is thrown forward the spring will be in position to check the passage of type through the spout in order to prevent the same from dropping in rear of the packer.

I may also here observe that in placing slugs or large-sized characters in the line, which are too large to be carried through the spout, I can place the same by hand in front of the packer at the proper moment.

The machines will be mounted upon suitable supports or legs, and provided at its front, below the keys, with drawers for containing the type, and also for holding small italics or characters not provided for in the keys, and which when ready can be taken out and dropped by hand into a short spout, $E^4$, arranged upon the main spout $E'$, so as to deliver said letters or characters onto the band passing below the said main spout. I also provide a rod or shipper, $V^4$, extending out through the front of the machine, so as to be within convenient reach of the operator, and pass the same back, so as to connect with a rod, $Y'$, adapted to actuate a clutch, $V^5$, employed to check the rotation of the gear-wheel, and at the same time to admit of the continued rotation of the belt-pulley $V'$. This clutch is mainly composed of a hub, $W^6$, secured to the pulley $V'$, and having a toothed end, $W^7$. The shaft $W^8$, carrying miter-gear $V^2$, passes loosely through the hub $W^6$, and has a slot, $W^9$, near one end. A sleeve, X, is loosely arranged on the shaft and within a cylindrical bearing, $X^3$, secured on one of the posts Y, said sleeve having a toothed end, $X'$, for engaging the toothed end $W^7$ of the hub. A pin, $x$, secured to the sleeve X, passes into and through a slot, $W^9$, in the shaft, (shown in dotted lines, Fig. 20.) A rotary sliding head, $X^2$, is arranged upon the hollow cylindrical bearing $X^3$, and is provided with a pin, $Y^2$, arranged to enter a slot, $Y^3$, formed in the said cylindrical bearing obliquely to its axis, said slot being also shown in dotted lines. The rotary head $X^2$ carries a pin, $Y^4$, that enters an annular groove, $Y^5$, in the loose sleeve X, as shown in dotted lines, whereby, when a partial rotation has been given to the head $X^2$ by moving the shipper-rod in one direction, the pin carried by said head, entering the oblique slot of the cylindrical bearing, will cause the head to slide upon its bearing, and hence by reason of the pin that enters the annular groove of the sleeve cause the same to move toward the band-wheel, and thereby clutch with the toothed end $W^7$ of the hub connected with the wheel $V'$. As the sleeve is coupled with the shaft by means of the pin $x$, it will be evident that motion will now be imparted to said shaft, and hence cause the rotation of the miter-gear thereon. A reverse movement of the shipper-rod of course unclutches the said devices, and hence allows the band-wheel $V'$ to run loosely on the shaft.

Having thus described my invention, what I claim, and desire to secure by Letters Patent, is—

1. The combination, in a type-setting machine, with a case-rest provided with throats or passages coinciding with the channels of the case, of devices, such substantially as described, for removing single types from the said throats or passages, the endless belt traveling under and transversely with respect to said passages, and the plate $E^3$, arranged to support the belt between the belt-wheels, and provided with marginal ribs $e'$ $e'$, projecting vertically on each side of the belt, for protecting and guiding the edges of the same, all essentially as set forth.

2. The combination, in a type-setting machine, with the case-rest provided with throats or passages coinciding with the channels of the case, of devices, such substantially as described, for removing single types from the said throats or passages, the endless belt traveling under and transversely with respect to said passages, and the lip or plate covering a portion of said belt between the belt-wheels, said plate being arranged to receive the heads of the falling type in order to cause the type to turn upon the belt, and also serving to hold the belt down, essentially as described.

3. The combination, in a type-setting machine, with the case-rest provided with throats or passages coinciding with the channels of the case, of devices, such substantially as described, for removing single types from said throats or passages, the endless belt traveling under and transversely with respect to the said passages, and the plate arranged over said belt, and provided with a series of slots arranged in part below the throats or channels in the case-rest and in part below the lower ends of the partitions between said throats or channels, the portions of said plate between the slots constituting the type-rests, and the plate being also adapted to hold down the endless belt along one edge, essentially as shown and described.

4. The combination, in a type-setting machine, of the endless belt for receiving the type from the cases, the belt driving-wheel F, around which the endless type-carrying belt passes, and the curved chute arranged over a portion of the belt passing around said wheel, the chute being constructed and arranged to receive and right the type carried by the belt at a point above the wheel, and to guide and deliver the type carried by the belt directly into the space between the line-breaker and the galley, substantially as described.

5. The combination, in a type-setting machine, of the yielding type-support $H'$ with the head I, adapted to be pushed out from the main frame by the said type-support, and the rod carrying the hub or sleeve $L^2$, and connected at its inner end with a spring, and at its outer end secured to the aforesaid head by an adjustable connection, in order to adapt the same to galleys of various sizes, substantially as described.

6. The combination, in a type-setting machine, of the yielding type-support with the extensible head I, the sliding bar $I'$, the rod and spring for retracting the same, and the jam-roller arranged to be forced inwardly by spring-pressure and wedged in between an incline and a sliding bar connected with the said extensible head, substantially as described.

7. The combination, with the yielding type-support and the extensible head I, of the sliding bar $I'$, connected with said head, the jam-roller provided with a pin and arranged within a wedge-shaped recess at the side of said sliding bar, the spring $I^3$, the loose pin N, adapted to be moved forward by the line-breaker, and the two rods $n'$ $n^2$, one of which is connected with the pin of the jam-roller and the other arranged loosely in its guide-passage, said devices being adapted to operate substantially as and for the purpose set forth.

8. The combination, in a type-setting machine, with the indicator-rod, of the wedge or key upon the rod $i$, and the pivoted lever $P^3$, arranged to be raised by said wedge when the line of type is nearly completed and to act upon the indicator-rod, substantially as and for the purpose set forth.

9. The combination, in a type-setting machine, of the endless type-carrier belt with the main chute $E'$, for delivering the type that are dropped from the cases onto the belt, and a short supplemental spout, $E^4$, through which small capitals, italics, or other signs or letters not provided for in the type-cases can be dropped by hand so as to pass into the main spout and drop on the belt, substantially as described.

10. The combination, in a type-setting machine, of the vibratory packer, the type-carrier belt, the belt-wheel, and the main type-delivery spout with the spring-check $F^2$, arranged to enter said spout, so as to check the passage of type, and also arranged to be forced out of the spout by the action of the belt-wheel F at the proper moment for delivering the type in front of the packer, substantially as described.

11. The combination, in a type-setting machine, of the belt-wheel F, having a series of rollers, $H^3$, with the vibratory packer H, the spring $H^4$, vibrating with the packer and acted upon by said rollers, and the device for adjusting said spring, substantially as described.

12. The combination, in a type-setter, of the line-breaker with the band-wheel F, provided with a series of studs arranged upon one side thereof, the vibratory lever L, arranged to stand during the formation of a line of type normally out of the path of the studs, the rod moving independently of the line-breaker and arranged to be carried forward as the line is filled, the hub or sleeve secured upon said rod, and arranged to act upon the lever when the line is filled and to throw said lever into the path of the studs, the bell-crank lever actuated by said vibratory lever, and the slide connected with the line-breaker and operated by the bell-crank lever, all substantially as and for the purpose described.

In testimony whereof I have hereunto set my hand in the presence of two subscribing witnesses.

JOHN NORTH.

Witnesses:
ALBERT H. NORRIS,
J. A. RUTHERFORD.